United States Patent [19]

Ohmori

[11] Patent Number: 4,886,963
[45] Date of Patent: Dec. 12, 1989

[54] LASER BEAM SCANNING APPARATUS WITH COMPACT SOS SENSOR

[75] Inventor: Naoto Ohmori, Osaka, Japan

[73] Assignee: Minolta Camera Kabushiki Kaisha, Osaka, Japan

[21] Appl. No.: 198,751

[22] Filed: May 25, 1988

[30] Foreign Application Priority Data

May 27, 1987 [JP] Japan .............................. 62-130969
May 27, 1987 [JP] Japan .............................. 62-130970

[51] Int. Cl.$^4$ ..................... H01J 3/14; G02B 26/08
[52] U.S. Cl. .............................. 250/235; 250/236; 350/6.8; 346/108
[58] Field of Search ..................... 250/234–236; 346/106, 107, 108; 350/6.7, 6.8; 356/44; 358/293

[56] References Cited

U.S. PATENT DOCUMENTS

| | | | |
|---|---|---|---|
| 3,970,359 | 7/1976 | Starkweather | 350/6.8 |
| 4,130,339 | 12/1978 | Kawamura et al. | 350/6.8 |
| 4,612,555 | 9/1986 | Hongou et al. | 346/108 |
| 4,613,877 | 9/1986 | Spencer et al. | 346/108 |
| 4,704,698 | 11/1987 | Reiniger | 346/160 |
| 4,731,623 | 3/1988 | Oda et al. | 346/160 |
| 4,823,002 | 4/1989 | Saito | 250/235 |

FOREIGN PATENT DOCUMENTS

| | | |
|---|---|---|
| 191179 | 11/1981 | Japan . |
| 58-93026 | 6/1983 | Japan . |
| 123062 | 6/1984 | Japan . |
| 61-3114 | 1/1986 | Japan . |

*Primary Examiner*—David C. Nelms
*Assistant Examiner*—Stephone B. Allen

[57] ABSTRACT

A laser beam scanning apparatus comprises a first mirror provided for reflecting a light path between a deflector and recording medium, a beam detecting sensor for determining a start position for recording by the beam on the recording medium, and a second mirror for guiding the beam reflected by the first mirror to the sensor. The second mirror is arranged such that the beam from the first mirror is guided to the sensor after it is reflected at least one time by said first mirror. In addition, the second mirror is arranged such that on the equation $\theta_2 = 2\theta_1$ is satisfied where $\theta_1$ and $\theta_2$ respectively denote the inclination of the first and the second mirrors to a plane orthogonal to a surface of scanning of the beam.

11 Claims, 3 Drawing Sheets

LASER BEAM SCANNING APPARATUS WITH COMPACT SOS SENSOR

BACKGROUND OF THE INVENTION

1. Field of the Invention

The present invention relates to a laser beam scanning apparatus and, more specifically, to a laser beam scanning apparatus in which a laser beam from a laser beam generating source is deflected by a deflector, whereby a recording medium is scanned and an image is formed thereon.

2. Description of the Prior Art

Generally, optical apparatuses for printers employing a laser beam carrying image information such as shown in Japanese Patent Laying-Open Gazette No. 3114/1986 and in Japanese Patent Laying-Open Gazette No. 93026/1983 are well known. Compared with an electrophotographic copying machine (plane paper copier) utilizing projected images of originals by the visible light, higher image quality is required for a printer. Therefore, the optical apparatus is a critical portion dominating the image quality, and various portions thereof should be adjusted when assembled. Such adjustment comprises adjustment of the distance between the semiconductor laser and a collimator lens, co-axializing of the two, adjustment of the angular position of the fore and aft position of a cylindrical lens, adjustment of the fore and aft position of an image reflecting mirror, and so on. The fore and aft position of the image reflecting mirror is adjusted by moving the mirror back and forth in the direction of the light axis to change the distance between the point of deflection by the deflector to the surface of the recording medium, thereby adjusting the magnification of main scanning.

When a polygon mirror, a hologram scan, a galvano mirror and the like having a plurality of equally divided planes of deflection is used as the deflector in such optical apparatus, a sensor (hereinafter referred to as SOS sensor) is provided for detecting the start point of image formation in order to compensate for the division error between each of the planes of deflection. The SOS sensor should be preferably set at an equivalent position to the recording medium. The elements constituting the optical apparatus should preferably be provided in a unit, so as to facilitate the positioning of the apparatus to the body of the printer, to reduce vibration and to facilitate the care of the apparatus such as exchange of parts.

However, as the distance between the deflector and the recording medium becomes longer as the width of main scanning becomes larger, there arises various problems in setting the SOS sensor at a position equivalent to the recording medium. More specifically, if the SOS sensor is arranged out of the optical unit, the advantages of the unit are missed. If the SOS sensor is provided in the unit so as to maintain the advantages, the optical unit itself becomes larger. Therefore, it becomes difficult to contain the unit in the printer body due to the space requirement, which may cause enlargement of the printer body.

In view of the foregoing, an apparatus is proposed in which a number of mirrors used exclusively for the sensor are arranged so as to reflect the light path at a number of points. However, this requires a larger number of parts, and requires much space, thereby causing the enlargement of the apparatus.

SUMMARY OF THE INVENTION

An object of the present invention is to provide an optical apparatus in which the optical apparatus can be manufactured in a unit without enlargement of the same, and in which the SOS sensor can be arranged at an equivalent position to the recording medium.

Another object of the present invention is to provide an optical apparatus in which the position of the entrance of the light to the SOS sensor does not deviate, thereby enabling easy adjustment.

In a laser beam apparatus in accordance with the present invention, the laser beam is deflected by a deflector, whereby the recording medium is being scanned.

In one aspect of the present invention, the laser beam scanning apparatus comprises: a first mirror provided between the deflector and the recording medium for deflecting the light path; a beam detecting sensor for determining the start point of recording by the beam on the recording medium; and a second mirror for guiding the beam reflected by the first mirror to the sensor. The second mirror is arranged such that the beam from the first mirror is guided to the sensor after it is reflected at least one time by the first mirror.

In another aspect of the present invention, the second mirror is arranged so as to satisfy the equation $\theta_2 = 2\theta_1$, where $\theta_1$ and $\theta_2$ are respectively the inclination of the first and second mirrors to a plane orthogonal to the surface of scanning by the beam.

The laser beam from the deflector is reflected by a first mirror, and reflected by the second mirror, thereafter reflected at least one time by the second mirror and enters the sensor. Therefore, even if the main scanning width becomes larger and the distance from the deflector to the recording medium becomes longer, the light path for the sensor can be made compact by means of the first and second mirrors.

In addition, when the first mirror is moved back and forth in the direction of the light axis so as to adjust the main scanning magnification, the laser beam enters the sensor without fail, since the angle of inclination of the second mirror to the subscanning direction is set to be twice the angle of inclination of the first mirror.

These objects and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be hereinafter described with reference to the figures.

Figure 1:
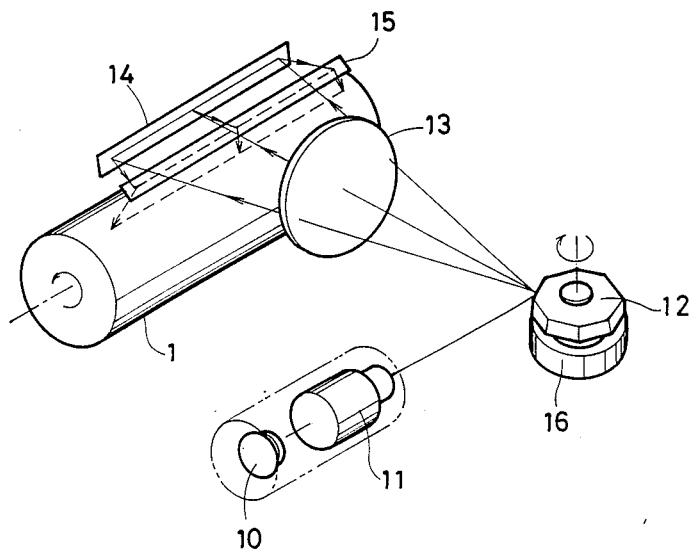
FIG. 1 is a perspective view showing the basic structure of an optical apparatus in accordance with the present invention.
Figure 2:
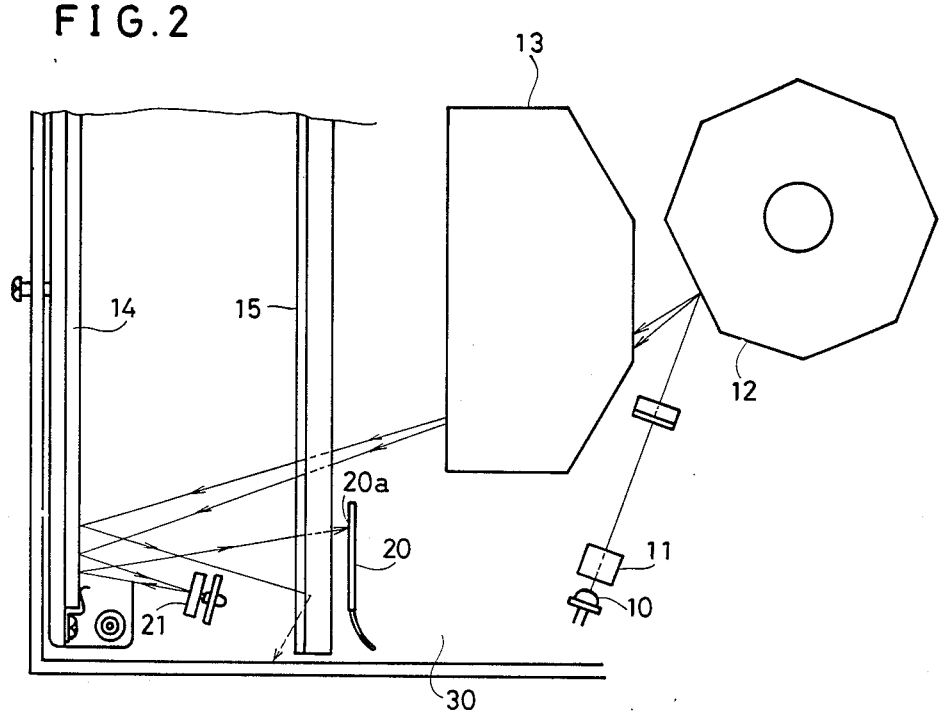
FIG. 2 is a plan view of the main portion of the optical apparatus.
Figure 3:
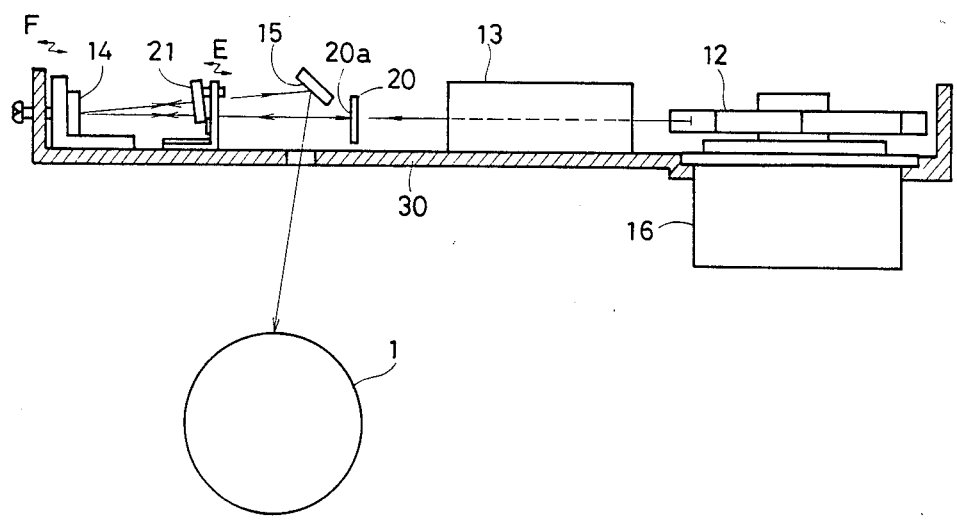
FIG. 3 is a vertical sectional view of FIG. 2.

In the present optical apparatus, a laser beam carrying image information irradiates a photoreceptor provided on a surface of a photoreceptor drum 1, whereby the drum is scanned by the laser beam in the axial direction. As shown in FIG. 1, the apparatus comprises a semiconductor laser 10, a collimator lens 11, a polygon mirror 12, a fθ lens 13, image reflecting mirrors 14 and 15 and a sensor for detecting a start position for image formation (hereinafter referred to as SOS sensor) 20, and mirrors 21 used only for the sensor shown in FIGS. 2 and 3, and the apparatus is provided on a substrate 30 as a unit.

A laser beam emitted from the semiconductor laser 10 is made into a parallel light by the collimator lens 11 to be guided to a polygon mirror 12. The polygon mirror 12 is rotary driven by a motor 16. By means of this rotation, the laser beam scans the photoreceptor drum 1 in a direction orthogonal to the axis of the rotation. In addition, the laser beam forms images on the photoreceptor drum 1 through the fθ lens 13 and the mirrors 14 and 15 for reflecting images. The fθ lens 13 equalizes the scanning speed of the laser beam on the photoreceptor drum 1 through beam scanning in association with the rotation of the polygon mirror 12.

The SOS sensor 20 compensates for any error of the recording position for each scanning derived from the division error of the deflection planes of the polygon mirror 12. In the SOS sensor 20, the laser beam reflected by the first image reflecting mirror 14 is reflected by the mirror 21 used only for the sensor, and thereafter, it is reflected by the mirror 14 to enter the light receiving portion 20a of the SOS sensor 20. The light receiving portion 20a is located at a position equivalent to the image forming surface of a photoreceptor drum 1 in order to detect the start position of image formation in the main scanning direction. The incidental light to the light receiving portion 20a is adjusted by turning the inclination of the mirror 21 for the sensor in the direction of the arrow E.

Meanwhile, in the optical apparatus such as disclosed in the present invention, the distance between the polygon mirror 12 and a photoreceptor drum 1 becomes as long as 200 mm or more when the maximum image width is set at the letter size or the legal size. In view of the foregoing, in the present embodiment, the image light path is made compact and therefore the optical unit is made small by employing two image reflecting mirrors 14 and 15. As for the SOS light path, the light path is made compact and the optical unit is made small by reflecting the beam twice by the first image reflecting mirror 14.

Figure 4:
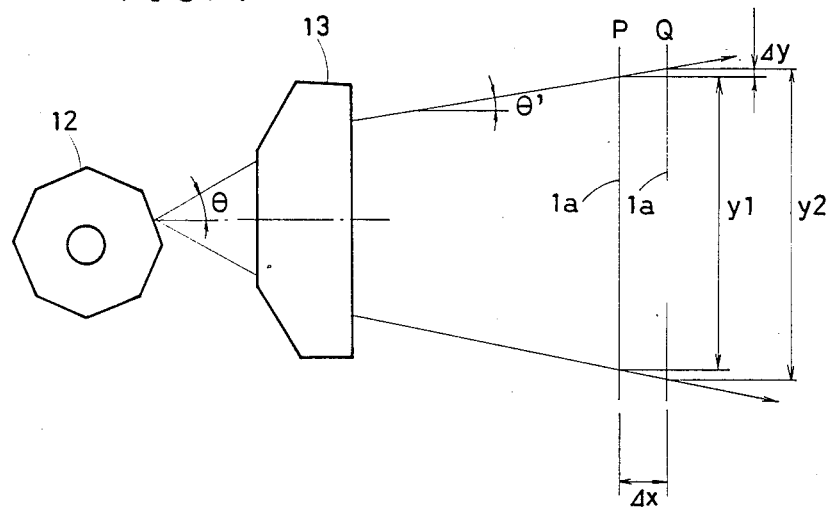
FIG. 4 is a schematic diagram illustrating the relation between the main scanning magnification, the point of focus and the angle of radiation of a f$\theta$ lens.

FIG. 4 shows a basic light path of the optical system with the mirrors omitted therefrom. The beam deflected by the polygon mirror 12 in the direction $\theta$ is turned by the fθ lens 13 in the direction $\theta'$. Assuming that the initial equivalent position of the photoreceptor is P, the scanning width of the photoreceptor surface 1a will be y1 for the angle of deflection $\theta$. On this occasion, by moving the reflecting mirror 14 or 15 in parallel to the light path, the distance between the deflector (polygon mirror) and the equivalent surface of the photoreceptor is changed, whereby the scanning width for the deflection angle $\theta$ is changed. The precision of the scanning width is denoted as the main scanning magnification, which can be adjusted by changing the equivalent position to the photoreceptor. Now, assuming that the equivalent position to the photoreceptor moves from P to Q by the distance $\Delta x$ by the movement of the reflecting mirror 14 or 15, the following equation is satisfied.

$$y2 - y1 = 2\Delta y = 2\Delta x \cdot \tan \theta' \tag{1}$$

In this embodiment, two mirrors are employed and the main scanning magnification can be changed by moving either of the two mirrors. However, since the main scanning magnification is more effectively adjusted by moving the first mirror 14, the first mirror 14 is moved in this embodiment.

Now, in such adjustment, if the adjustment of the beam to the SOS sensor is conducted first by rotating the mirror 21 for the sensor in the direction of the arrow E and thereafter the first mirror 14 is moved in the direction of the arrow F so as to adjust the main scanning magnification, the beam to the SOS sensor may be misadjusted.

Figure 5:
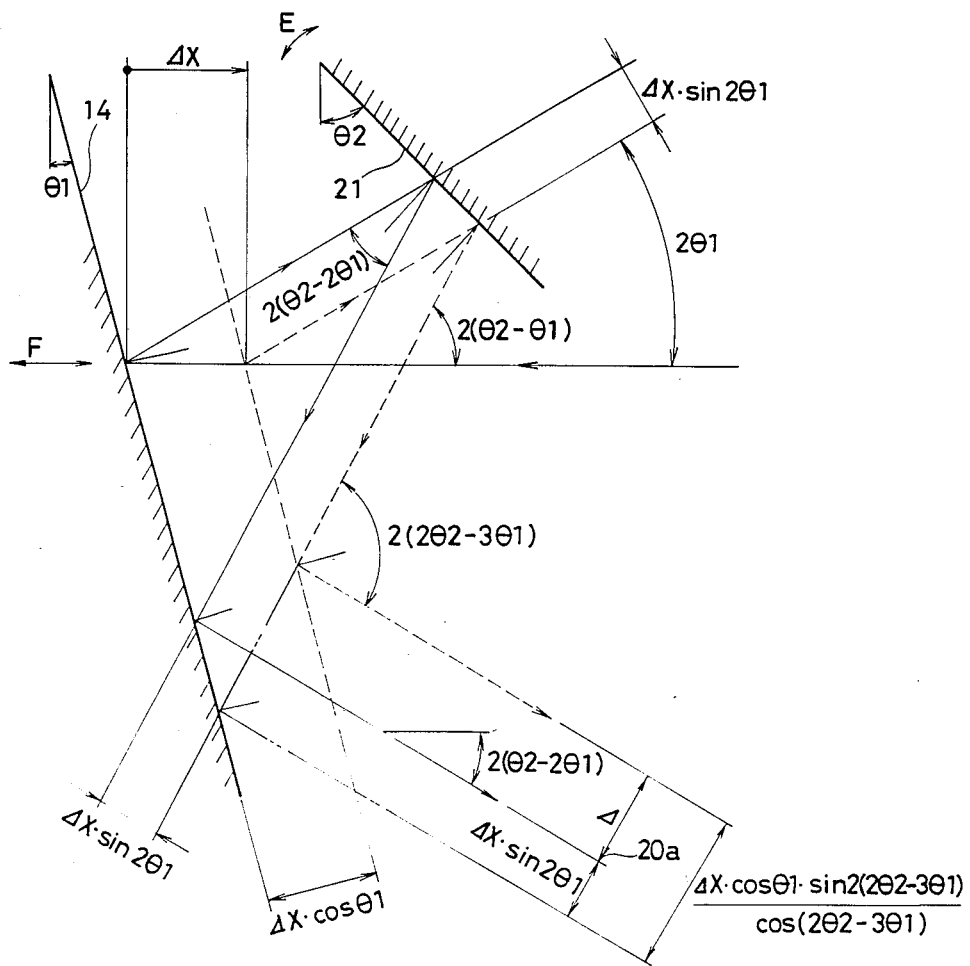
FIG. 5 is a schematic diagram illustrating the SOS light path.

FIG. 5 shows the movement of the beam to the SOS sensor when the first mirror 14 is moved to the direction of the light axis by $\Delta X$. Let us assume that the inclination of the first mirror 14 to the direction vertical to the light axis (subscanning direction) is $\theta_1$ and the inclination of the mirror 21 for the sensor is $\theta_2$. On this occasion, the beam to the SOS sensor is reflected in the direction of $[(2\theta_2 - 2\theta_1)]$ in association with the light axis, by the dedicated mirror 21. Therefore, when the first mirror 14 is moved downstream of the light axis by $\Delta X$, the beam to the SOS sensor entering the light receiving portion 20a is slightly shifted upward by $\Delta$. Now, $\Delta$ will be defined by the following equation.

$$\Delta = \frac{\Delta X \cdot \cos\theta_1 \cdot \sin 2(2\theta_2 - 3\theta_1)}{\cos(2\theta_2 - 3\theta_1)} - \Delta X \cdot \sin 2\theta_1$$

$$\begin{aligned}
&= 2(\Delta X)\cdot\cos\theta_1\cdot\sin(2\theta_2 - 3\theta_1) - \Delta X \cdot 2\sin\theta_1\cdot\cos\theta_1 \\
&= 2(\Delta X)\cdot\cos\theta_1\{\sin(2\theta_2 - 3\theta_1) - \sin\theta_1\} \\
&= 4(\Delta X)\cdot\cos\theta_1\cdot\cos(\theta_2 - \theta_1)\cdot\sin(\theta_2 - 2\theta_1)
\end{aligned} \tag{2}$$

If the value $\Delta$ is made "0", the beam to the SOS sensor enters the light receiving portion 20a of the SOS sensor 20 without fail even if the first mirror 14 is moved after the adjustment of the beam to the SOS sensor. This can be done by making any of $\cos\theta_1$, $\cos(\theta_2 - \theta_1)$, $\sin(\theta_2 - 2\theta_1)$ equal to "0" in the equation (2). Now, the following equation can be satisfied.

$$\sin(\theta_2 - 2\theta_1) = 0$$

$$\theta_2 = 2\theta_1 \tag{3}$$

If the condition of the equation (3) is satisfied, the laser beam reflected first at the first mirror 14 is returned to the same path to the main scanning direction when it is reflected by the dedicated mirror 21 and, the beam is again reflected by the first mirror 14 to enter the light receiving portion 20a. In this case, the beam to the SOS sensor is reflected in the direction parallel to the laser beam from the fθ lens 13 by the second reflection $[2(\theta_2 - 2\theta_1) = 0]$.

Therefore, by setting the inclination of the dedicated mirror 21 to the direction vertical to the main scanning direction twice the inclination of the first mirror 14, the beam to the SOS sensor will not be deviated from the light receiving portion 20a by the adjustment of the main scanning magnification regardless of the order of adjustment of the mirrors 14 and 21.

The optical apparatus in accordance with the present invention is not limited to the above described embodiment and various modifications may be made in the scope of the spirit thereof.

For example, the second image reflecting mirror 15 may be used for reflecting twice the laser beam in order to make compact the SOS light path. One or more image reflecting mirrors may be used. One or more mirrors may be used for the sensor. What is critical is that the laser beam is once reflected by a mirror dedicated to the sensor and, thereafter, it is reflected at least one time by an image reflecting mirror. This makes the SOS light path compact. In addition, by setting the angle of inclination $\theta_2$ of the mirror dedicated to the sensor to the subscanning direction twice the angle of inclination $\theta_1$ of the image reflecting mirror, the deviation of the entrance position of the beam to the SOS sensor can be eliminated in adjusting the main scanning magnification.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A laser beam scanning apparatus for beam scanning a recording medium with the laser beam being deflected by a deflector, comprising:
    a first mirror provided for reflecting a light path between said deflector and said recording medium;
    a beam detecting senor for determining a start position for recording by the beam on said recording medium; and
    a second mirror for guiding the beam reflected by said first mirror to said sensor, wherein said second mirror is arranged such that the beam from the first mirror is guided to said sensor after it it further reflected at least one time by said first mirror.

2. A laser beam scanning apparatus according to claim 1, wherein
    said first mirror has a length dimension sufficiently large enough to cover the scanning length of the beam; and
    said second mirror has a length dimension sufficient to receive a beam in one portion of the scanning range.

3. A laser beam scanning apparatus according to claim 2, wherein a light receiving portion of said sensor is located at a position equivalent to a surface of image formation of said recording medium.

4. A laser beam scanning apparatus for beam scanning a recording medium with the laser beam deflected by a deflector, comprising:
    a first mirror provided for reflecting a light path between said deflector and said recording medium;
    a beam detecting sensor for determining a start position for recording by a beam, on said recording medium; and
    a second mirror for guiding the beam reflected by said first mirror to said sensor, said second mirror being arranged such that the beam from said first mirror is guided to said sensor after it is further reflected at least one time by said first mirror and that the equation $\theta_2 = 2\theta_1$ is satisfied where an inclination of the first and second mirrors to a plane orthogonal to a surface of scanning of the beam are respectively defined as $\theta_1$ and $\theta_2$.

5. A laser beam scanning apparatus according to claim 4, wherein
    said first mirror has a length sufficient enough to cover the scanning range of the beam, and
    said second mirror has a length enough to receive a beam of one portion of the scanning range of the beam.

6. A laser beam scanning apparatus according to claim 5, wherein
    a light receiving portion of said sensor is arranged at a position equivalent to a surface of image formation of said recording medium.

7. A laser beam scanning apparatus according to claim 6, wherein said first mirror is arranged such that the beam is reflected twice.

8. A laser beam scanning apparatus according to claim 7, wherein said second mirror comprises means for adjusting an inclination of said second mirror.

9. A laser beam scanning apparatus according to claim 7, wherein said first mirror is movable in the direction of the light axis so as to adjust the main scanning magnification.

10. A laser beam scanning apparatus for scanning a recording medium with a laser beam, comprising:
    at least a first mirror for reflecting a scanning laser beam onto the recording medium;
    means for adjusting the magnification ratio of the recording medium by movement of the first mirror;
    a sensor for detecting a scan position of the laser beam on the recording medium, and
    a second mirror for redirecting the laser beam reflected from the first mirror back to the first mirror at an angle of incidence for reflection to the sensor, the second mirror being relatively fixed during any movement of the first mirror to adjust the magnification ratio.

11. A laser beam scanning apparatus as in claim 10 wherein the angular relationship of the first mirror and the second mirror is defined as approximately:

$$\theta_2 = 2\theta_1$$

wherein $\theta_1$ is the angle of inclination of the first mirror and $\theta_2$ is the angle of inclination of the second mirror relative to a plane orthogonal to the scanning surface of the recording medium contacted by the laser beam.

* * * * *

UNITED STATES PATENT AND TRADEMARK OFFICE
CERTIFICATE OF CORRECTION

PATENT NO. : 4,886,963
DATED : December 12, 1989
INVENTOR(S) : Naoto Ohmori

It is certified that error appears in the above-identified patent and that said Letters Patent is hereby corrected as shown below:

Claim 11 should read as follows:

11. A laser beam scanning apparatus as in Claim 10 wherein <u>said laser beam is scanned to form a plane surface containing the scanning laser beam before reflection by the first mirror;</u> the angular relationship of the first mirror and the second mirror is defined as approximately:

$$\theta_2 = 2\theta_1$$

wherein $\theta_1$ is the angle of inclination of the first mirror and $\theta_2$ is the angle of inclination of the second mirror relative to a plane orthogonal to the [scanning] surface of the [recording medium contacted by the] <u>scanning</u> laser beam.

Signed and Sealed this

Twenty-fifth Day of December, 1990

*Attest:*

HARRY F. MANBECK, JR.

*Attesting Officer*     *Commissioner of Patents and Trademarks*